United States Patent [19]

Woehrle et al.

[11] 4,290,108

[45] Sep. 15, 1981

[54] CONTROL UNIT FOR A CONVERTER

[75] Inventors: Patrick Woehrle, Erlangen; Adolf Habock, Uttenreuth; Paul F. Müller, Erlangen, all of Fed. Rep. of Germany

[73] Assignee: Siemens Aktiengesellschaft, Berlin and Munich, Fed. Rep. of Germany

[21] Appl. No.: 51,371

[22] Filed: Jun. 25, 1979

[30] Foreign Application Priority Data

Jul. 6, 1978 [DE] Fed. Rep. of Germany ....... 2829793

[51] Int. Cl.³ ............................................ G06F 15/20
[52] U.S. Cl. .................................. 364/480; 364/486; 318/810; 363/41
[58] Field of Search ............... 364/480, 701, 486, 484, 364/483; 318/810, 811; 363/41

[56] References Cited

U.S. PATENT DOCUMENTS 3,480,858  11/1969  Bauman et al. ................. 364/486 X
3,568,166   3/1971  Gentilly et al. ..................... 364/486
4,049,953   9/1977  Evans, Jr. ........................... 364/701

Primary Examiner—Edward J. Wise
Attorney, Agent, or Firm—Kenyon & Kenyon

[57] ABSTRACT

A control unit for a converter has a circuit for the formation of a periodic control signal having a given pulse pattern including a memory in which code words designating the position of the switching pulses (flanks) of the control signals in one period or subperiod of the converter voltage, divided into a number of increments, are stored. Address input of the memory is connected to an addressing unit which generates addresses associated with the pulse pattern of the control signal and with the switching pulses within the pulse pattern. A digital comparator compares the code words at the output of the memory with the count of a counter. Whenever the code word and the count are in agreement, the comparator triggers a pulse stage generator whose output signal represents the control signal and advances the addressing unit to the next address. The invention makes possible the formation of control signals independent of circuit for different converter types and converter circuits is thus made possible.

10 Claims, 13 Drawing Figures

| Addresses | | (dec) | Memory Content | (dec) |
|---|---|---|---|---|
| $A_9 \ldots\ldots A_3$ | $A_2 \ldots A_0$ | | | |
| 0 0 0 0 0 0 0 | 0 0 0 | 0 | 0 0 1 0 0 0 1 0 | 34 |
| 0 0 0 0 0 0 0 | 0 0 1 | 1 | 0 1 0 0 0 1 0 0 | 68 |
| 0 0 0 0 0 0 0 | 0 1 0 | 2 | 0 1 1 0 0 1 1 0 | 102 |
| 0 0 0 0 0 0 0 | 0 1 1 | 3 | 1 0 0 0 1 0 0 0 | 136 |
| 0 0 0 0 0 0 0 | 1 0 0 | 4 | 1 0 1 0 1 0 1 0 | 170 |
| 0 0 0 0 0 0 0 | 1 0 1 | 5 | 1 1 0 0 1 1 0 0 | 204 |
| 0 0 0 0 0 0 0 | 1 1 0 | 6 | 1 1 1 0 1 1 1 0 | 238 |
| 0 0 0 0 0 0 0 | 1 1 1 | 7 | 1 1 1 1 1 1 1 1 | 255 |

| 1 0 0 1 0 1 1 | 0 0 0 | 600 | 0 0 1 0 0 0 0 0 | 32 |
| 1 0 0 1 0 1 1 | 0 0 1 | 601 | 0 1 0 0 1 0 0 0 | 72 |
| 1 0 0 1 0 1 1 | 0 1 0 | 602 | 0 1 1 0 0 0 0 0 | 96 |
| 1 0 0 1 0 1 1 | 0 1 1 | 603 | 1 0 0 1 0 0 0 0 | 144 |
| 1 0 0 1 0 1 1 | 1 0 0 | 604 | 1 0 1 0 0 0 1 0 | 162 |
| 1 0 0 1 0 1 1 | 1 0 1 | 605 | 1 1 0 1 0 1 1 0 | 214 |
| 1 0 0 1 0 1 1 | 1 1 0 | 606 | 1 1 1 0 0 1 0 0 | 228 |
| 1 0 0 1 0 1 1 | 1 1 1 | 607 | 1 1 1 1 1 1 1 1 | 255 |

| 1 1 1 1 1 1 1 | 0 0 0 | 1016 | 0 0 0 1 1 1 1 0 | 30 |
| 1 1 1 1 1 1 1 | 0 0 1 | 1017 | 0 1 0 0 1 0 1 1 | 75 |
| 1 1 1 1 1 1 1 | 0 1 0 | 1018 | 0 1 0 1 1 1 0 1 | 93 |
| 1 1 1 1 1 1 1 | 0 1 1 | 1019 | 1 0 0 1 0 1 1 0 | 150 |
| 1 1 1 1 1 1 1 | 1 0 0 | 1020 | 1 0 0 1 1 1 0 0 | 156 |
| 1 1 1 1 1 1 1 | 1 0 1 | 1021 | 1 1 0 1 1 1 0 1 | 221 |
| 1 1 1 1 1 1 1 | 1 1 0 | 1022 | 1 1 0 1 1 1 1 0 | 222 |
| 1 1 1 1 1 1 1 | 1 1 1 | 1023 | 1 1 1 1 1 1 1 1 | 255 |

CONTROL UNIT FOR A CONVERTER

BACKGROUND OF THE INVENTION

1. Field of the Invention

This invention relates to a control unit for a converter having a circuit arrangement for the formation of a periodic control signal with a given pulse pattern.

2. Discussion of the Prior Art

In known control methods for converters, the control signal is obtained through comparison of voltages. This requires adjusting the components used, such as amplifiers, reference voltage generators, and comparators, as well as compensation of drift errors.

Known control methods for converters can be divided into those using phase gating controls and those using pulse width controls. The control speed of a pulse-width control is greater than that of a phase gating control and its harmonic content is greatly reduced. The pulse frequency can be set high, so that the harmonic content of the current remains small, with only small inductances needed in the load circuit. The harmonic spectrum can be designed with a low cost filter in mind. This reduces both the weight and the volume of the converter and improves it efficiency. The higher the pulse frequency selected, the more accurately the desired curve can approach the output voltage. An upper pulse frequency limit is set by the switching times of the converter valves and their switching losses.

Known controls for converters operate either as phase gating controls at a constant pulse frequency and with variable "on" time, or as phase gating controls at a variable pulse frequency and with either constant "on" time or constant "off" time (Heumann, Stumpe "Thyristors", 1974, pages 167, 168) or, thirdly, by the pulse-width-modulated method (BBC Reports, 1966, pages 44 to 52). In pulse-width-modulation, the intersections of a sine wave voltage with a triangular wave voltage are the switching points of the control voltage as a pulse-width-modulated voltage having two voltage levels. The ratio of the sine wave voltage to the triangular wave voltage amplitude determines the number of switching points.

In another known method for generation of a pulse-width-modulated control voltage for converters, a sine wave voltage is compared with a triangular wave voltage composed of a main triangular voltage and a reference triangular voltage (German Offenlegungschrift No. 19 45 960).

In another known method for generation of a control signal for a converter, a sine wave voltage of constant amplitude is compared with a number of DC voltages which are symmetrical to the zero line (German Patent No. 21 12 186, U.S. Pat. No. 3,820,,003). The DC voltages are varied to control the converter output voltage amplitude. This method is particularly well suited for three-phase systems.

The methods mentioned for the generation of control signals for converters, particularly the pulse control methods each require special circuits. The ease of realization of the circuit for each control method must be considered. The wave form frequencies and the amplitudes of the voltages to be compared with one another must be adjusted exactly. The components must have no drift errors.

It is an object of this invention to provide a control unit for converters capable of generating the control signals for different converters and applications in a universal way and which allows the pulse pattern of the control signals to be determined without requiring construction of a circuit with reference voltage generators and comparators.

SUMMARY OF THE INVENTION

According to the present invention, this problem is solved as follows:

(a) Code words which designate the position of the switching pulse edges (flanks) of the control signal in one period or subperiod of the input or output AC voltage of the converter, divided into a number of increments, are stored in a memory.

(b) The address input of the memory is connected to an addressing unit which generates addresses associated with the pulse pattern of the control signal and with the switching pulse edges within the pulse pattern.

(c) The code word output of the memory is connected to a first comparator input of a digital comparator and the second comparator input is connected to a counter which counts the pulses of a clock generator, each clock pulse being assigned the significance of one increment.

(d) Whenever the code word read out of the memory is in agreement with a count (counter word) formed by the counter, the output signal of the comparator triggers a pulse generator whose output signal represents the control signal, and advances the addressing unit to put out the next address.

In a circuit arrangement constructed in accordance with the invention, one period or sub-period of the control signal is divided into as large a number of increments as possible. The time sequence of the switching pulse edges of the control signal is stored in digital form as code words in a memory, in particular in a read only memory. The timely recall of the code words designating the switching pulse edges for a certain pulse pattern is obtained by comparison of the counter, running at constant or variable frequency, with the code words read out of the memory. The counter frequency preferably bears a fixed relation to the input or output voltage frequency of the converter and is, for instance, an integral multiple of the converter frequency. But this is not absolutely necessary if the counting frequency is sufficiently high. The code words are entered in the memory at storage locations selected by the addressing unit. The code word out of the memory remains while the counter is counting, until there is agreement with the count in the counter. Whenever there is agreement, the addressing unit addresses the storage point of the next switching pulse of the respective pulse pattern. In turn, the code word read out of this storage location remains until there is again agreement with a word in the counter. At every agreement of code word and counter, the pulse generator stage flips from "0" "1" or from "1" to "0". The output signal of the pulse generator is the desired pulse-width-modulated control signal.

This circuit arrangement makes possible the generation of control signals for converters which can be specified completely independent of a circuit realized by means of reference voltage generators and comparators. For example, the control signals can be specified with the desired output voltage harmonic spectrum, when the application is for inverter control units, or for a particular reaction of the input voltage, when the application is for rectifier control units. A control unit using a circuit arrangement in accordance with the invention can be applied without change of circuit form to different converter types and converter circuits. Possibly the memory needs to be programmed only with the code words for the switching pulse edges of the pulse pattern of the desired control signal. For most applications, pre-programmed read-only memories, such as PROMs, will be employed in the control unit. But it is also possible to use a write/read memory and to program it by means of a computer which determines the approximately most favorable pulse pattern from operating data measured during the converter operation.

Basically, it is possible to store the switching pulse edges of the control signal for a whole period. In that case, the highest possible count corresponds to the total numer of increments of a period.

To save memory space it is advantageous to make the highest possible count of the counter correspond to a subperiod of the control signal, preferably a quarter period. Then, a first counter sweep furnishes the pulse pattern switching flanks for the first quarter period of the control signal. The second quarter period of the control signal is obtained by calling up the same switching pulse edges with the counter counting backwards. In the third quarter period of the control signal the counter again runs forward and, in the fourth quarter period, backwards again. If a control signal having two active levels is desired, the output signal of the pulse generator may be inverted in the second half period of the control signal.

The waveform and the amplitude of the output voltage, or the reaction on the input voltage of a converter so controlled, are determined by the pulse pattern of the control signal, i.e., by the time position of the switching flanks. When an inverter serves as the converter, the waveform of its output voltage can, in particular, be sinusoidal, triangular, or trapezoidal. Generally, a certain waveform will be specified for a given application. For inverter applications, an inverter output voltage which is variable as to amplitude or an inverter output voltage amplitude held constant, in the event of DC input voltage variations, is also generally desirable. In rectifier applications a constant DC output voltage with variable AC input voltage or a controllable DC output voltage is required as a rule. For this purpose a number of pulse patterns may be stored in the memory and the control signal switching pulse edges are selected so that the converter output voltage is settable in steps. For example, when using 128 pulse patterns, the amplitude of the converter output voltage can be varied stepwise in 128 steps between 0% and 100%.

However, with the circuit arrangement of the invention, it is also possible, for instance, to vary the waveform of the output voltage of an inverter as a function of its drive. Thus, in converter drive applications, the pulse patterns can be selected so that the converter generates a trapezoidal output voltage in a first driving range, a sinusoidal output voltage in a second driving range, and a triangular AC voltage in a third driving range.

The maximum number of stored pulse patterns and the number of switching pulse edges per pulse pattern are determined by the storage capacity of the memory used. Thus, a 1K×8-bit read only memory can store a total of 64 control signal pulse patterns which may have between 8 and 15 switching edges in each quarter period. A memory of the same storage capacity can store 128 control signal pulse patterns which each contain between 4 and 7 switching edges per quarter period. If less than 4 switching pulse edges are required per quarter period using the same storage capacity, as many as 256 pulse patterns can be stored. Therefore, the number of pulse patterns and the number of switching pulse edges within each pulse pattern are fixed, while taking into consideration the storage capacity of the read only memory, flexibility is restrained with respect to pulse frequency and word length. The number of pulse patterns determines the control possibilities of the converter output voltage. The number of switching pulse edges within a pulse pattern determines the harmonic content of the inverter output voltage and with it, also, the cost of the filter required.

The accuracy of the time position of the switching flanks of the control signal is determined by the number of increments into which a period or subperiod of the control signal is divided. In turn, the number of increments determines the width of the code words stored in the memory. When using code words eight bits long, a quarter period can be divided into 256 increments. Hence, the switching pulse edges can be fixed exactly to the 256th part of a quarter period of the control signal. This time increment corresponds to an angle of 0.351 degrees electrical.

Due to the application of digital technology, interference suppression is much improved in the circuit arrangement of the invention. Offset compensation, drift equalization, and other adjustments are obviated. One particular advantage is the flexibility in formation of control signals for triggering converters. The pulse patterns are not inflexibly predetermined by a circuit design. Instead, the desired frequency spectrum of the output voltage or of the reaction on the input voltage of the converter can be fixed first, the desired pulse pattern determined therefrom, and the switching pulse edges of the pulse pattern, thus established, stored in the memory.

The number of switching pulse edges, their position in time, and the number of pulse patterns can be determined by taking the desired frequency spectrum, the filter design, and other parameters into consideration.

In another aspect, the invention also makes it possible to provide input pulse patterns which permit operation with unconventional filters. Moreover, pulse patterns can be fed in whose realization by analog means would either not be possible at all or only with very elaborate circuitry. Also, it is possible to have a microcomputer compute the pulse patterns continuously.

According to a further embodiment of the invention, a particularly simple and, therefore, preferred address formation is obtained by forming the addresses in the addressing unit so that each is composed of a first and a second subaddress, the first subaddress being formed by a counter started whenever there is agreement between code word and counter word, and the second subaddress being formed by a shift register which cyclically transfers a signal determining the modulation of the converter. The cyclic transfer of the signal determining the modulation of the converter takes place at the beginning of each quarter period, for instance.

The signal determining the modulation of the converter can be fed directly to the shift register by a digital setting device or by a digital control device. When using analog setting devices such as setting potentiometers, the shift register input may be connected to an analog setting device or to a control device via an analog/digital converter.

Another way of forming addresses is by making the addressing unit a microcomputer which determines the addresses in response to digitally entered control signals. This embodiment of the invention is suited, in particular, for extensive controls in converter installations.

A circuit arrangement according to the invention can be applied to the control of converters having fixed, infinitely variable, or stepwise variable, frequencies. The counter may be clocked with variable frequency for the generation of a periodic control signal of variable frequency. The variable frequency is produced, for example, by a voltage/frequency converter. For a periodic control signal of stepwise variable frequency, a constant frequency clock may be used with a controllable frequency divider preceding the counter.

The counter may be synchronized by means of an external synchronizing signal to insure particularly high-quality control of a converter. The synchronizing signal may be derived from a common synchronizing oscillator when several converters are operated in parallel. For parallel operation of a converter having an AC voltage supply system, the synchronizing signal may be derived from the AC system.

BRIEF DESCRIPTION OF THE DRAWINGS

FIG. 3 shows the programming and addressing of a read-only memory;

DETAILED DESCRIPTION OF THE INVENTION

Figure 1:
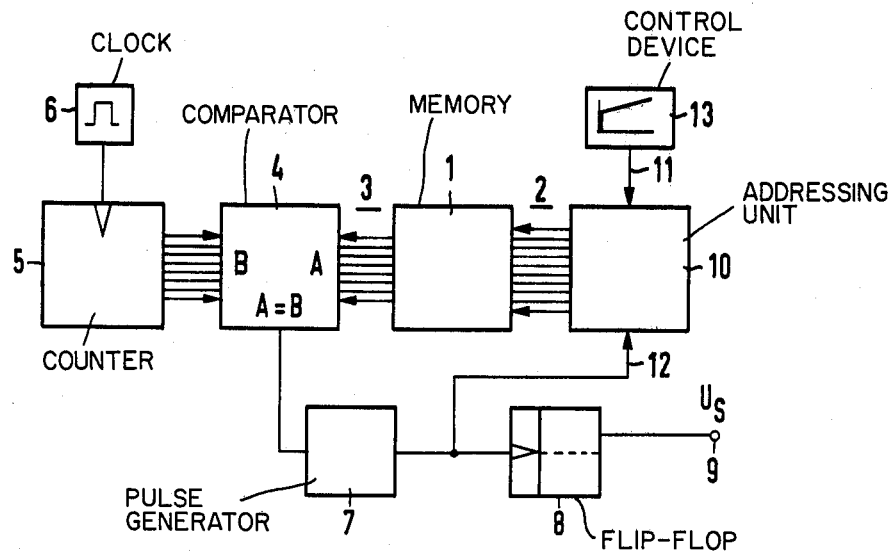
FIG. 1 shows a block diagram of a circuit arrangement for the generation of a pulse-width modulated control signal for application to an inverter, according to the teachings of the invention.

FIG. 1 shows a block diagram of a circuit arrangement according to the invention for the formation of a periodic, preferably pulse-width modulated, control signal $U_S$. The circuit arrangement contains a memory 1, such as a PROM, read-only memory, having a 10-bit wide address input 2 and an 8-bit wide code word output 3. The switching pulse edges of the control signal $U_S$ are stored in memory 1 in the form of code words whose principle of formation is explained by FIG. 2. The timely call-up of the switching pulse edges is brought about by appropriate addressing which is described in connection with FIG. 3.

The addressing input 2 of memory 1 is connected to an addressing unit 10 which puts out the addresses of the switching pulse edges of the desired control signal $U_S$. If the modulation of the converter is to be variable, the circuit arrangement according to the invention must produce control signals with different pulse patterns. This requires that addressing unit 10 be controlled with respect to one pulse pattern out of a number of pulse patterns, which is associated with a certain modulation of the converter, and with respect to the sequence of the switching pulse edges within this pulse pattern. The pulse pattern associated with a particular modulation of the converter is selected by means of a control voltage applied to the pulse pattern control input 11 which is connected to a control device 13, for example. The time sequence of the switching pulse edges within a pulse pattern is determined by the control commands at the switching pulse edge control input 12.

The code word output 3 of memory 1 is connected to comparator input A of a comparator 4 whose other comparator input B is connected to the 8-bit wide output of a counter 5. Counter 5 counts the pulses of a clock 6. If influencing the amplitude of the converter output voltage is all that is required, clock 6 runs at constant pulse frequency. If the frequency of the converter output voltage should be varied as well, a clock having a variable pulse frequency output may be used, such as voltage/frequency converter. Whenever there is agreement of the word at comparator input A with the word from the counter at comparator input B, comparator 4 transmits, on its output side, a signal which is transformed by a pulse generating stage 7 into a control signal for a flip-flop 8. The state of flip-flop 8 is switched with every control pulse at its dynamic input. The control signal $U_S$ appears at the output 9 of the flip-flop. The control pulse, which is formed by pulse generator 7 whenever there is agreement of the word from the memory counter with that from the counter (A=B), controls address unit 10 via the switching pulse edge control input 12 in such a manner that the address of the next switching flank within the pulse pattern determined by the control voltage at the pulse pattern control input 11 is switched to address input 2 of memory 1.

The invention is described below in detail by way of concrete illustrative examples. In each, inverters transforming a DC input voltage into a sine-wave AC output voltage at constant frequency are employed as converters.

Figure 2:
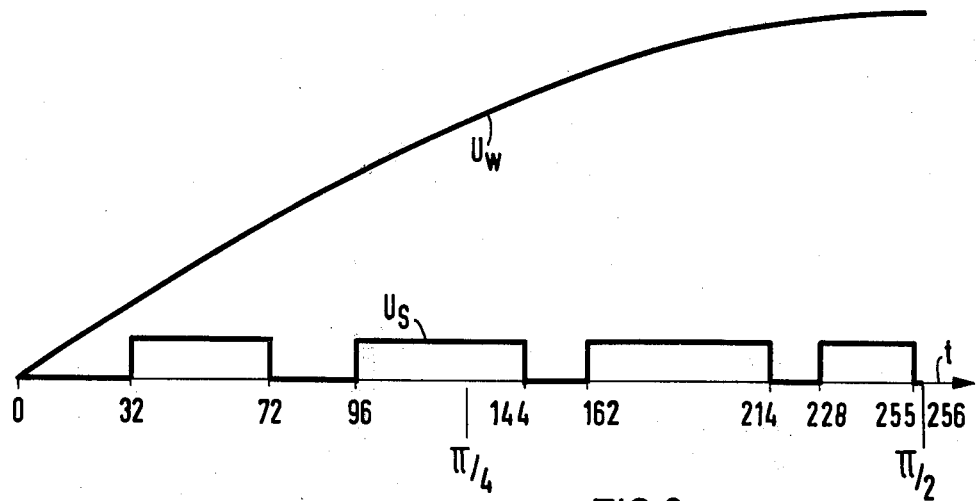
FIG. 2 is a chart showing a pulse-width modulated control signal and the related output voltage of an inverter.

FIG. 2 shows the shape of the sine-wave AC output voltage curve $U_W$ of an inverter and the shape of the associated pulse-width modulated control signal $U_S$ over a quarter period. The quarter period is divided into 256 increments. The code words of the switching pulse edges of the control voltage $U_S$ are marked on the time axis t. The code words associated with the switching pulse edges are stored in memory 1 and can be called up by means of related addresses. For a different modulation of the inverter or another output voltage curve shape, a control signal having a different pulse pattern is required. The switching pulse edges of these other pulse patterns are also stored in the memory and can be called up via other addresses. One subaddress designates the desired pulse pattern; the other designates the switching pulse edge within the respective pulse pattern. Thus, if the pulse pattern in the illustrative example described is to have no more than 8 switching pulse edges per quarter period and the inverter output voltage is to be variable in 128 steps, 128 pulse patterns each having 8 switching pulse edges are required and are stored in memory 1. This requires 1024 code words and 1024 storage spaces, 8 bits in width and addressable via 1024 addresses, are required.

FIG. 3 shows, in tabular form, the addresses and the associated code words, as memory contents, for three different pulse patterns. The addresses and code words are given in the binary system and, for easier readibility, also in the decimal system. The upper pulse pattern is assigned, for example, to the minimum inverter output voltage. The pulse pattern in the middle is assigned to the inverter output voltage shown in FIG. 2. The lower pulse pattern is assigned, for example, to the maximum inverter output voltage.

The first column shows the addresses which are produced by the address unit and are divided into two sub-addresses occupying the address lines A0 to A9 of addressing input 2 of memory 1. Address lines A0 to A2 are occupied by a 3-bit wide, first sub-address which runs through the binary numbers 000 to 111 (decimal 0 to 7) in each pulse pattern. The first subaddress designates the switching pulse edges within a pulse pattern. The address lines A3 to A9 are occupied by a second sub-address, designating the respective pulse pattern.

The associated memory contents which designate the time increment at which a switching pulse edge should occur in the control signal are given to the right of the addresses. Since every quarter period of the control signal is divided into 256 increments, each increment corresponds to a binary number between 0000 0000 and 1111 1111 (decimal 0–255). When programming the memory, the time, fixed as an increment at which a switching flank is to occur in the control signal, is stored as a binary code word. The code words are stored in ascending order. The first code word stored is that at which the control signal flips, for the first time, from the level for the logic state "0" to the level for the logic state "1", or from level "1" to level "0". At the second code word the control signal returns to its original state.

Figure 4:
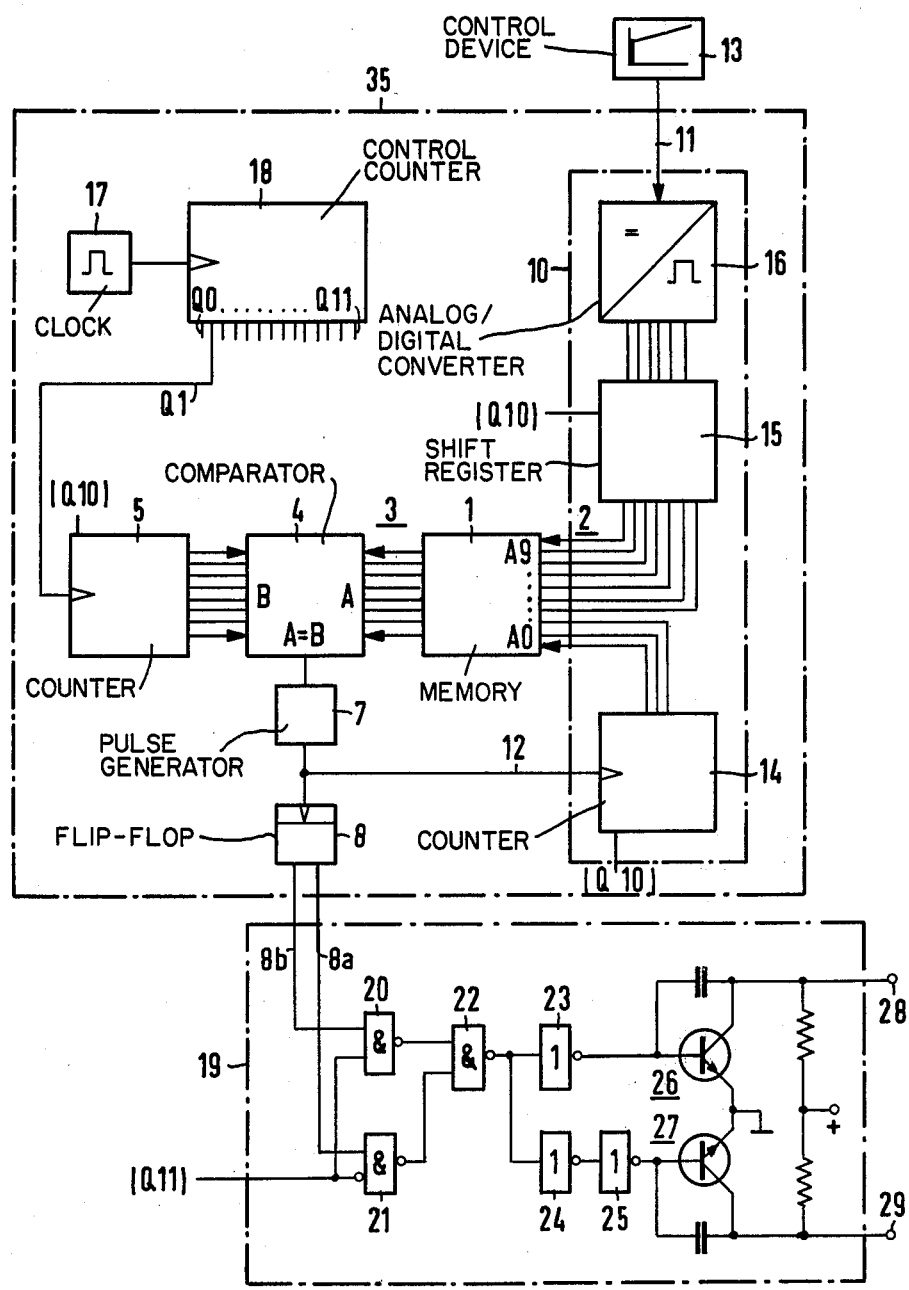
FIG. 4 is a combination block and schematic diagram of a circuit arrangement for an inverter according to the teachings of the invention.
Figure 5:
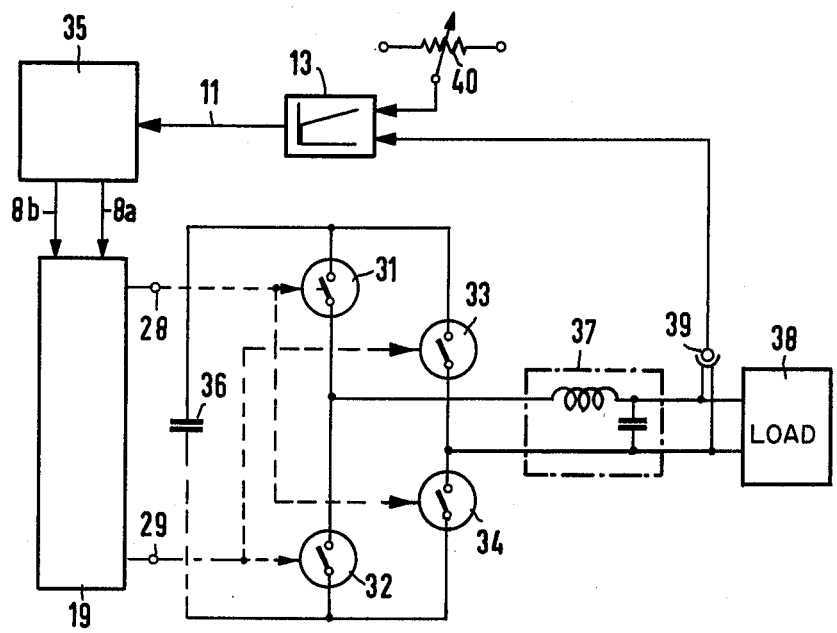
FIG. 5 is a schematic diagram of a converter controlled by the circuit arrangement shown in FIG. 4.

FIG. 4 is a block diagram of a circuit arrangement 35, according to the invention, for driving the inverter shown in FIG. 5 with the illustrative pulse-width modulated control signal described in FIGS. 2 and 3. Identical or functionally identical components or subassemblies have the same reference symbols as in the basic diagram of FIG. 1.

Memory 1 is a 1024×8-bit PROM, or read-only memory. The 8-bit code word present at its output, when it is appropriately addressed, is compared by comparator 4 with the 8-bit output of counter 5, clocked at constant pulse frequency. Whenever there is agreement, read-only memory 1 is addressed further via pulse generator 7 and addressing unit 10, and flip-flop 8 is triggered. Read-only memory 1 is addressed, in binary form, via its 10-bit addressing input 2 having address lines A0 to A9. The entire circuit arrangement 35 is controlled by a central control counter 18, designed as a 12-bit counter having outputs Q0 to Q11. Central control counter 18 is clocked by constant frequency oscillator 17. The counter output Q1 clocks counter 5 whose stored signals are compared with the code words read out of memory 1. The connections of the other wires of the other outputs of central control counter 18 which lead to similar components are not shown in the drawing in order to preserve its clarity. The designations of the outputs of control counter 18 intended for other circuits are shown in brackets at the inputs of the respective components. Also not shown are the circuit arrangements for a clock scanner, as is common practice in digital circuits.

In the circuit shown, addressing unit 10 includes another counter 14, a shift register 15, and an analog/digital converter 16. The analog input of analog/digital converter 16 is pulse pattern control input 11 which is connected to inverter control device 13 designed as voltage regulator, for instance. Analog/digital converter 16 converts the control voltage present at pulse pattern control input 11 into digital values which characterize the pulse pattern assigned to the respective control voltage. The respective digital values are fed to shift register 15 which applies the pulse pattern characterization to address lines A3 to A9 when called for by an enabling pulse (ouput Q10) derived from central control counter 8 at the start of each quarter period. This corresponds to the formation of a subaddress determining the pulse pattern by the control voltage.

Address lines A0 to A2 are connected to counter 14 whose counting input is triggered by pulse former 7 whenever there is agreement between the count in counter 5 and the word read out of the read-only memory 1. Counter 14 in addressing unit 10 forms the rest of the subaddress which indicates the switching pulse edge in the pulse pattern.

Upon each agreement of counter word and code word, fliip-flop 8, whose outputs are connected to output logic circuit 19, is triggered by the pulse former 7. Output logic 19 is also connected to output Q11 of central control counter 18 by which a square-wave signal of the same period as the pulse-width modulated control signal is applied. Output logic circuit 19 transforms the pulse-width modulated control signal appearing at outputs 8a and 8b of flip-flop 8 into a control signal having two active levels and applies it to control lines 28 and 29 to address the inverter valves directly.

The inputs of a NAND gate 20 in the output logic circuit 19 are supplied by the output 8b of flip-flop stage 8, which carries the inverse of the control signal and by the square-wave signal from output Q11 of central control counter 18, respectively. One input of a second NAND gate 21 is connected to the output 8a of the flip-flop 8 which carries the control signal and the inverting input of NAND gate 21 is connected to output Q11. The outputs of NAND gates 20 and 21 are connected to a third NAND gate 22. The output of NAND gate 22 is connected, via an inverting stage 23, to a first amplifier stage 26 which supplies amplified control signals to control line 28. The output of NAND gate 22 is also connected, via series-connected inverting stages 24 and 25, to a second amplifier stage 27 which supplies amplified control signals to control line 29.

Output Q10 of central control counter 18 carries a square-wave signal having half the period of the pulse-width modulated control signal. The square-wave signal at output Q10 is, therefore, used for the control of the operating mode (forward/backward) of counters 5 and 14. Additional square-wave pulses used as inhibiting pulses, starting pulses, and interlocking pulses are also derived from central control counter 18. The generation and use of these pulses, which are required in a functioning circuit arrangement but are not necessary for understanding the invention, are not detailed in the figures and are only described briefly as follows:

After every other counting cycle, i.e. after one forward counting phase and one backward counting phase, counters 5 and 14 are reset to the condition "0". Thus an error arising from an interfering signal is erased after one half period at the most. At the same time, flip stage 8 is also set to a defined starting state. After each quarter period, additional inhibiting pulses are generated which lock counters 5 and 14 when switching from one pulse pattern to another pulse pattern. Flip-flop stage 8 is also locked in order to prevent a malfunction of the flip-flop stage, when switching between two pulse patterns. Central control counter 18 also controls the start of analog/digital converter 16. Every inhibiting pulse at the end of a quarter period of the pulse-width modulated control signal releases, for the next quarter period, the input control voltage applied to pulse pattern control input 11 of analog/digital converter 16 into the shift register. Immediately thereafter analog/digital converter 16 is started for a new conversion which must last no longer than one quarter period. In this way a new sub-address, possibly characterizing another pulse pattern, is again available at the beginning of the next quarter period.

When using a control circuit arrangement 35 in connection with a controller, a dead time occurs which is essentially determined by the time required by analog/digital converter 16 for conversion of an analog value present at pulse pattern control input 11 into a binary signal. One may proceed as described, by sampling the control voltage at the beginning of each quarter period of the control signal and converting it to a digital value. At the start of the next quarter period, read-only memory 1 is addressed in accordance with the control voltage sampled in the previous quarter period. This causes a dead time, of maximally one half period of the pulse-width modulated control signal, to occur between a variation of the control voltage and the corresponding variation of the firing pulses for the inverter. This suffices for numerous applications. A fast analog/digital converter which converts the analog value fed to the pulse pattern control input 11 into a digital value during the dead time of the counters between two quarter periods can be used for fast controls. The control output voltage at the end of a quarter period is then already available as digital value at the beginning of the next quarter period.

The circuit arrangement 35 shown in FIG. 4 can be modified, for example, by using for the counter 14, a counter with four outputs which are connected to four address lines. Then six address lines remain available for the shift register and the number of possible pulse patterns is reduced to 64, but then the number of switching pulse edges per quarter period of the pulse width modulated control signal would increase to 15.

FIG. 5 shows the principle of controlling a bridge-connected inverter by a circuit arrangement 35 and the output logic 19 succeeding it, according to the invention as shown in FIG. 4. Pulse pattern control input 11 of circuit arrangement 35 is connected to a controller 13. Control channels 28 and 29 of output logic circuit 19 carry the firing pulses for the controlled semiconductor values of the inverter. The inverter, which is bridge-connected, contains valves schematically shown as electronic switches 31 to 34. The inverter outputs are connected to a load 38 via a low pass filter 37. Other filter circuits may also be used, including unconventional filters. The output voltage of the inverter is picked up after filter 37 by a voltage measuring transformer 39 and fed to the control quantity input of control device 13. The reference quantity input of control device 13 is connected to a desired value transmitter 40 which is shown as potentiometer. Instead of a potentiometer, a higher ranking control or, in particular a regulating device may also be provided. Each of the valves 31 and 34 of the inverter is driven simultaneously by control channel 28 and each of the valves 32 and 33 is driven simultaneously by control channel 29.

Modulation of the inverter may be accomplished through the output voltage of control device 13 by means of one of the 128 pulse patterns stored. As to the control action, attention must be paid to the already described dead time between the time of a scan of the controller output voltage and its input into the analog/digital converter in circuit arrangement 35 and the time when, due to the converter analog value, a new pulse pattern can be called up. It is pointed out that the switching pulse edges cannot be changed continuously because only a limited number of pulse patterns can be stored. Therefore, when there is a variation of the output voltage of controller 13, switching is always possible only from one pulse pattern to another pulse pattern. Depending on the control circuit, measures for the prevention of instabilities are required.

The circuit arrangement of the invention is suited not only for formation of control signals, in particular pulse-width-modulated control signals for single-phase converters, but also for the generation of control signals for multiple-phase converters and for three-phase converters in particular. There are several possibilities for the generation of multiple-phase control signals, from which the most favorable possibility is chosen in view of the particular application. Some of these possibilities are described in the following, each addressing the most frequently occurring practical application, a three-phase, pulse-width modulated-control signal. According to the invention, a first possibility for the generation of a three-phase, pulse-width-modulated control signal consists of generating a single-phase control signal in the manner already described, and deriving the control signals for the additional phases from the control signal for the first phase by appropriate delays of the control signal for the first phase.

Figure 6:
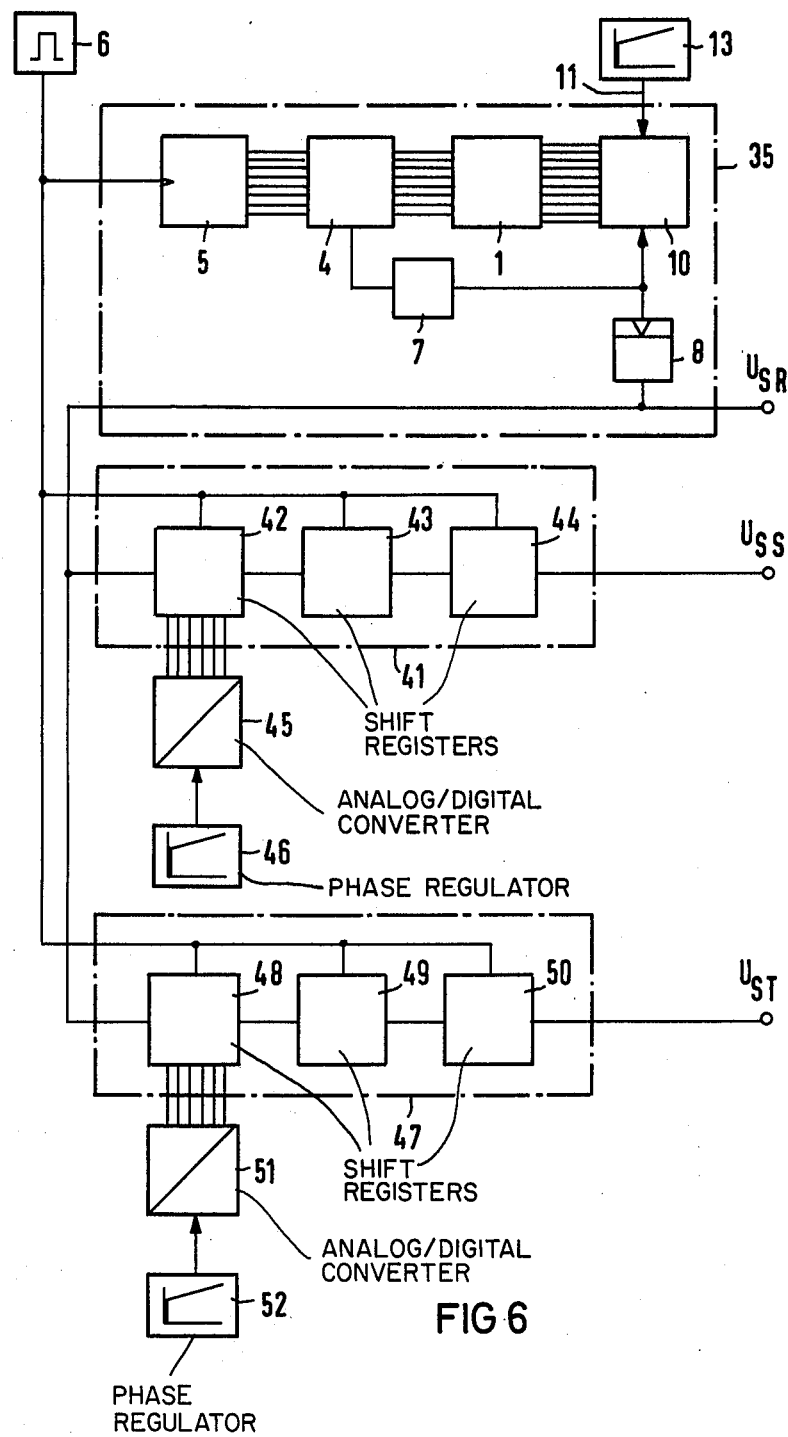
FIG. 6 is a block diagram of a circuit arrangement for generation of a three-phase, pulse-width modulated control signal for a three-phase inverter.

FIG. 6 shows a block diagram of this first possibility for the generation of three-phase, pulse-width-modulated control signals by means of a circuit arrangement according to the invention. The single-phase control circuit 35 may be the same as shown in FIGS. 1 and 4. Control circuit 35 generates a pulse-width-modulated control signal $U_{SR}$ as control signal for phase R of a converter.

The pulse width modulated control signal $U_{SS}$ for phase S of the converter is delayed by a number of clock periods of counter 5, corresponding to a 120° shift. Accordingly, the control signal $U_{SS}$ represents a repetition of the control signal $U_{SR}$ after a time interval of 120° electrical. For the formation of the control signal $U_{SS}$ for the S phase of the converter, the control signal $U_{SR}$ for the R phase is fed to a shift register circuit 41 which consists of series-connected, 64-bit shift register 42, a 64-bit shift register 43, and a 256-bit shift register 44. The clock inputs of shift registers 42, 43, 44 are connected to the clock input of counter 5 in control circuit 35. The control signal $U_{SR}$ for the R phase of the converter is applied to the input of first shift register 42.

The control signal $U_{ST}$ for the T phase of the converter represents a repetition of the control signal for the R phase at a time delay of 240° electrical. It is obtained by delaying the control signal $U_{SR}$ by the number of clock periods of counter 5, which corresponds to a 240° shift. For this purpose, the control signal $U_{SR}$ is analogously fed to shift register circuit 47 which consists of a series-connected 64 bit shift register 48, a 128-bit shift register 49, and a 512-bit shift register 50. The clock inputs of shift registers 48, 49, 50 are again connected to the clock input of counter 5 in control circuit 35.

If the delays of the pulsed width-modulated control signals $U_{SR}$ are preset and fixed in shift registers 42, 43, 44 and 48, 49, 50, respectively, a constant delay of the control signal $U_{SS}$ by 120° electrical and of the control signal $U_{ST}$ by 240° electrical can be obtained. But, for many applications, it is desirable to vary the phase shift between the individual control signals within a limited range. This can be accomplished by determining, through an external 6-bit address in shift register 42 and in shift register 48, respectively, by how many clock units the control signal $U_{SR}$ is to be delayed by shift registers 42 and 48, respectively. The 6-bit addresses are formed by analog/digital converters 45 and 51, respectively, whose analog inputs are connected to phase regulators 46 and 52, respectively. This makes it possible to adjust the phase shift between the control signal $U_{SR}$ for the R phase and the control signal $U_{SS}$ for the S phase in steps of 0.35° electrical between 112.9° electrical and 135.5° electrical. The shift between the control signal $U_{SR}$ for the R phase and the control signal $U_{ST}$ for the T phase can be adjusted stepwise between 225.9° and 248.5° in any case.

In the arrangement shown in FIG. 6, a quarter period of the control signal can no longer be divided into 256 increments because, when so divided, the desired phase delay of 120° electrical or 240° electrical would correspond to no integral number of clock periods. However, the counter 5 in control circuit 35 can be reset to zero after every count of 254. Then 340 clock periods will correspond to a delay of 120° and 680 clock periods to a delay of 240° electrical.

The circuit arrangement shown in FIG. 6 is low in cost circuitwise. Each one of the two delay units consists merely of a shift register, possibly with adjustable delay, and two shift registers having fixed delay. To be sure, only the pulse pattern of the control signal $U_{SR}$ for the R phase of the converter is determined as a function of the output voltage of control device 13. The control signals $U_{SS}$ and $U_{ST}$ for the other converter phases S and T cannot be influenced independently of the R phase. A variation of the output voltage of control device 13 becomes effective in the S phase with a delay of 120° only, in addition to the dead time already described, and in the T phase with a delay of 240° only, in addition to the dead time.

Another arrangement for the formation of a three-phase, pulse-width-modulated control signal by a circuit arrangement according to the invention consists in providing three circuit arrangements according to the invention and operating them with a fixed, predetermined, phase delay.

Figure 7:
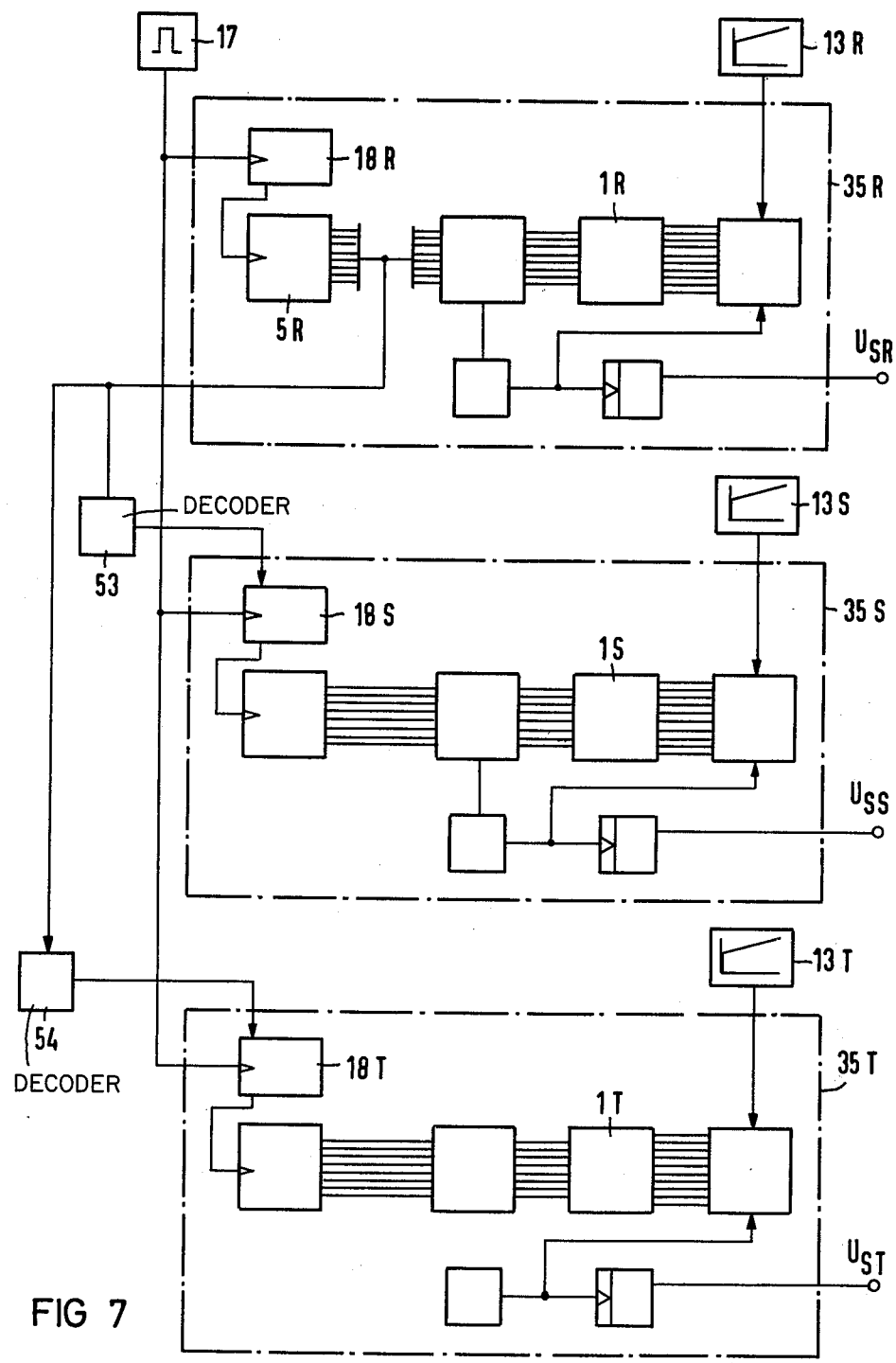
FIG. 7 is a block diagram of another embodiment of the invention for formation of a three-phase, pulse-width modulated control signal for a three-phase inverter.

FIG. 7 shows a circuit arrangement for the generation of a three-phase control signal $U_{SR}$, $U_{SS}$, and $U_{ST}$ by three single-phase circuit arrangements 35R, 35S, and 35T, the phase angle between the control signals for the phases R, S, T being predetermined and fixed. The first circuit arrangement 35R, the design of which was explained in detail in FIG. 4, generates the control signal $U_{SR}$ for the R phase of the converter. The other circuit arrangements 35S, 35T, each of a design similar to that of the circuit arrangement 35R, generate the control signals $U_{SS}$ and $U_{ST}$ for the S and T phases of the converter. The circuit arrangements 35S and 35T are triggered by circuit arrangement 35, via decoders 53 and 54, after 120° and 240° delays, respectively. Central control counters 18S and 18T in circuit arrangements 35S and 35T are started by starting pulses from decoders 53 and 54, respectively. Decoders 53 and 54, respectively, generate a starting pulse whenever a count (counter word) in counter 5R agrees with a given code word corresponding to the intended phase shift. It is also possible to drive the decoders with counter words from central control counter 18R. Oscillator 17 clocks the circuit arrangements 35R, 25S, 35T jointly. Each one of the three circuit arrangements has a separate memory 1R, 1S, 1T. EAch one of the circuit arrangements is preceded by a separate control device 13R, 13S, 13T. Therefore, each converter phase can be controlled individually via appropriate pulse patterns.

Figure 8:
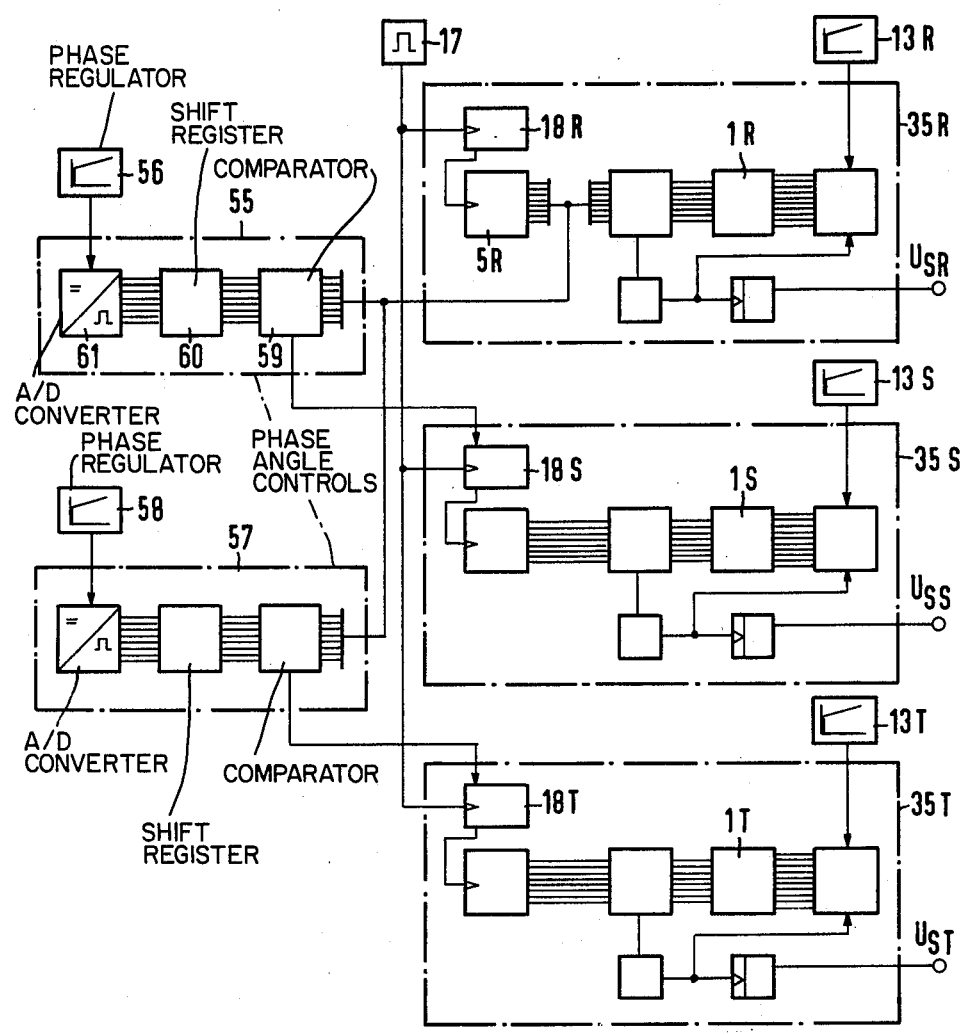
FIG. 8 is a block diagram of another embodiment of the invention for generation of a three-phase, pulse-width modulated control signal for a three-phase inverter.

The embodiment of FIG. 7 for the formation of a three-phase, pulse-width-modulated control signal by a single-phase control can also be developed further to provide an adjustable phase shift between the phases R, S, T. FIG. 8 shows such a circuit arrangement, the design of which corresponds in principle to the circuit arrangement of FIG. 7. Provided in place of the decoders, however, are phase angle controls 55 and 57 which make possible phase shifts between the converter phases R and S or R and T, respectively, which are variable as a function of the output voltages of phase regulators 56 and 58. Phase angle controls 55 and 57 generate starting signals for central control counters 18S and 18T in circuit arrangements 35S and 35T. The design of the phase angle controls will now be described in detail, using phase angle control 55 as an example.

Phase angle control 55 contains a comparator 59, a shift register 60, and an analog/digital converter 61 in the circuit shown. One input of comparator 59 is connected to the counter word output of counter 5R in control circuit 35. The second input of comparator 59 is connected to the output of shift register 60. The input to shift register 60 is derived from analog/digital converter 61, to whose analog input the output voltage of the phase regulators 56 is applied. Analog/digital converter 61 converts the controller output voltage into a digital word which shift register 60 feeds to the second comparator input at the beginning of each control signal period. This word indicates the phase shift between the R and S phases of the converter determined by phase regulator 56. When this word agrees with the counter word of counter 5R, central counter 18S in control circuit arrangement 35S is started. Therefore, the control signal $U_{SS}$ starts with a delay relative to the control signal $U_{SR}$ which corresponds to the number of clock periods of clock 17 determined by the output voltage of the regulator 56. The phase angle control 57 for the T phase operates in the same way.

Another possibility for the generation of a multiple-phase, pulse-width-modulated control signal consists in combining the pulse patterns of the various phases into one aggregate pattern and storing the switching pulse edges of the aggregate pattern in a read-only memory. When interrogating the switching pulse edges of the aggregate pattern, a valve selector circuit assigns each switching pulse edge to the converter valve to be driven at that particular moment.

Figure 9:
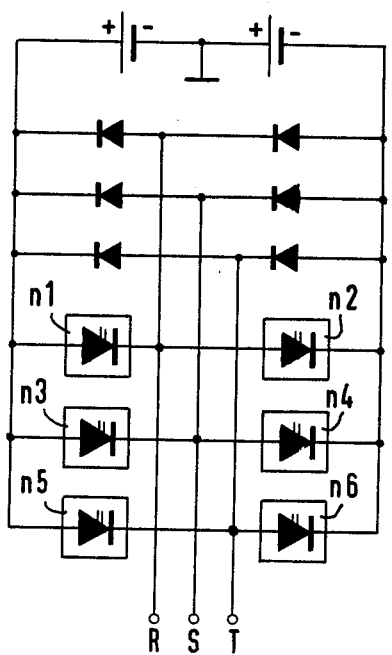
FIG. 9 is a circuit diagram of a three-phase bridge connected inverter.

FIG. 9 shows schematically the design of a three-phase, bridge-connected inverter with the firing and quenching valves n1 to n6, and with the associated reverse-current diodes.

Figure 10:
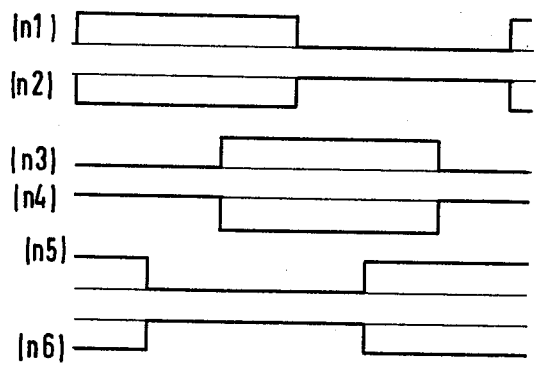
FIG. 10 is a chart of the "on" times of the valves of the bridge-connected inverter of FIG. 9.

FIG. 10 shows the conduction times of the valves n1 to n6 of the bridge-connected inverter of FIG. 9 with a drive of only one firing per period each.

Figure 11:
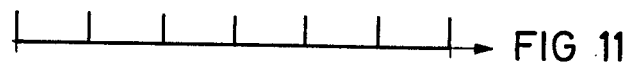
FIG. 11 is a chart of an aggregate pulse pattern, without consideration of the commutating processes, for driving the bridge-connected inverter of FIG. 9 by a simple control signal having only one pulse in each half period.

FIG. 11 shows the switching flanks of an aggregate pattern as the sum of the pulse patterns for the individual phases of the inverter. It is evident that, at each change in the current conduction of one of the inverter valves n1 to n6, a switching flank appears in the aggregate pattern. Accordingly, an inverter valve is fired and another valve is quenched at every switching pulse edge of the aggregate pattern. The commutation pause required may be formed by a suitable delay circuit. The aggregate pattern has three times as many switching pulse edges as a comparable single-phase pattern. With this circuit, it is not possible to divide a control signal period into four quarter periods and to determine the switching pulse edges of each quarter period by having the counter 5 count forward and backward. Rather, the pulse pattern for each whole period must be stored. It follows that the circuitwise realization of the switching flanks in an aggregate pattern, as shown in FIG. 12, requires a total of 12 times the storage space required by a single-phase control signal.

Figure 12:
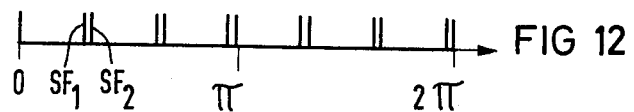
FIG. 12 is a chart of an aggregate pulse pattern for driving the bridge-connected inverter shown in FIG. 9 by a simple control signal having only one pulse in each half period which takes the commutating processes into consideration.

FIG. 12 shows the switching pulse edges of an aggregate pattern, taking into consideration the commutation process. At each individual switching pulse edge only one particular valve is addressed. For instance, at the switching pulse edge $SF_1$, a quenching pulse for the valve n5 is transmitted, and, at the switching pulse edge $SF_2$, a firing pulse for the next valve n6 is transmitted. For the circuitwise realization of the possibility for storing the firing times for both the main valves and quenching valves of an inverter, twice again the storage space is required as compared to the possibility shown in FIG. 11.

Figure 13:
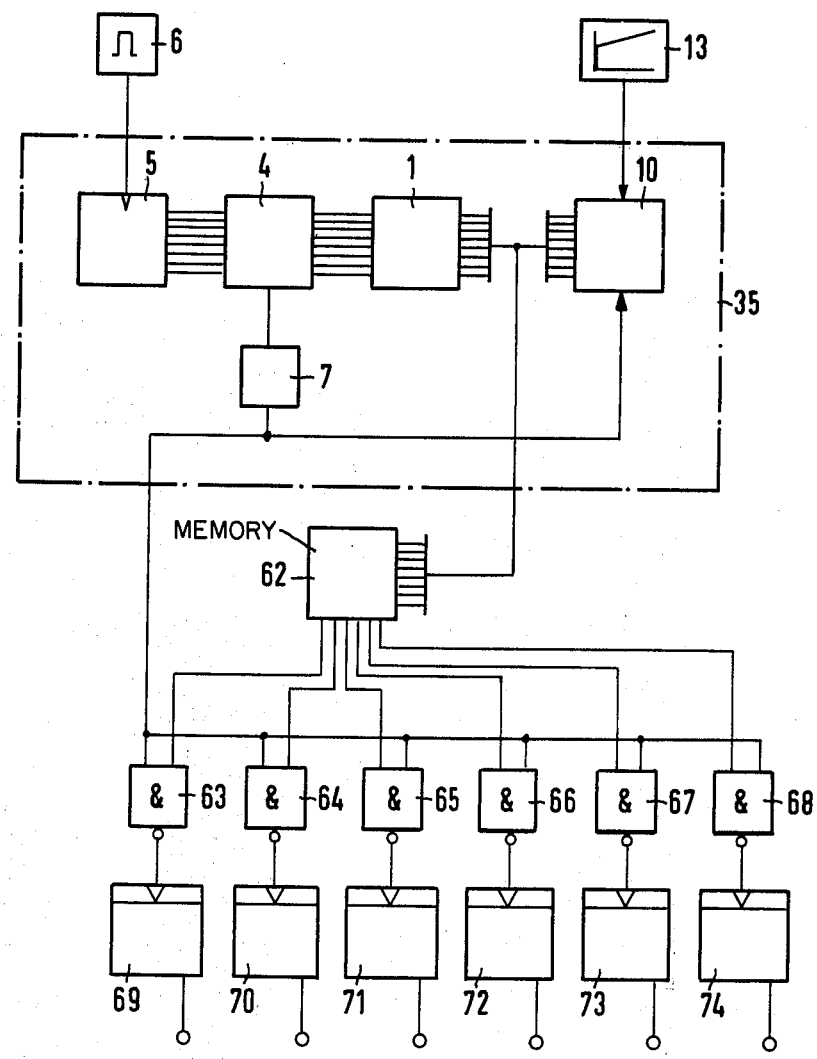
FIG. 13 is a block diagram of a circuit for the formation of a three-phase pulse-width modulated control signal, using aggregate patterns according to the invention.

FIG. 13 shows schematically the realization of the storage of the switching pulse edges of an aggregate pattern such is shown in FIG. 11, without taking the commutation processes into consideration. The control circuit 35 again corresponds to the preceding examples, except that a memory having correspondingly greater storage capacity is provided. Moreover, a valve selector circuit utilizing a second memory 62 is provided which is addressed by addressing unit 10 in parallel to read-only memory 1. Following valve selector memory 62 are NAND gates 63 to 68 whose inputs are connected respectively to the output of pulse former 7 and to one of the output lines of second valve selector memory 62. The outputs of NAND gates 63 to 68 are connected to the dynamic inputs of flip-flop stages 69 to 74. Pulse width-modulated control signals for the control of the main valves and quenching valves of the inverter appear at the outputs of the flip-flop.

Words, each containing a logic "0" in five digits and a logic "1" in a sixth digit, are stored in valve selector memory 62, e.g., 010000. As soon as addressing unit 10 puts out the address of a certain switching pulse edge, a word programmed for that particular switching pulse edge appears at the outputs of valve selector memory 62, e.g. 010000. The logical "1" in this word is applied to one input of NAND gate 67. Now, as soon as there is agreement in control circuit 35 between the counter word of counter 5 and the code word read out of the memory 1, pulse stage 7 transmits a pulse not only to addressing unit 10, but also to the other input of NAND gate 67. The NAND gate is switched into conduction and triggers flip-flop 67; the respective valve is fired.

What is claimed is:

1. A circuit for forming a periodic control signal having a predetermined pulse pattern for modulating a converter stage comprising:

a memory for storing code words designating the position of switching pulse edges of a periodic control signal for a time interval, divided into increments, of up to one period of one of the AC input voltage and the output voltage of the converter, the memory having an address input, a memory advancing input, and a code word output comprising pulse patterns of a control signal for modulating a converter stage;

a clock generator for generating clock pulses, each clock pulse representing one increment;

a first counter coupled to the clock generator for counting the clock pulses and forming a count word;

a digital comparator having a first input coupled to the code word output of the memory and a second input coupled to the counter word output of the counter, and the comparator generating an output signal upon each agreement of the code word and the count word;

a pulse generator coupled to the signal at the output of the comparator and having an output coupled to the memory advancing input; and a second counter coupled to the output of the pulse generator and having an output signal coupled to the address input of the memory, the second counter generating a first subaddress upon each agreement of the code word and the count word; and a shift register having an output coupled to the memory address input, the shift register responsive to a modulation control signal for cyclically generating a second subaddress and supplying it to the memory.

2. A circuit in accordance with claim 1 in which the shift register has an input and further comprising:

an analog setting device coupled to the input of the shift register via an analog/digital converter.

3. A circuit in accordance with claim 1 for use in providing a control signal having a variable frequency comprising:

means for varying the frequency of the first counter.

4. A circuit in accordance with claim 1 for providing a periodic, variable frequency control signal comprising:

a controllable frequency divider coupled to the input of the first counter.

5. A circuit in accordance with claim 1 further comprising:
means for synchronizing the first counter by an external synchronizing signal.

6. A circuit in accordance with claim 1 for producing a single-phase control signal in which the switching pulse edges for a quarter period of a control signal are stored in the memory, and further comprising:
means for reversing direction of the first counter at the end of each quarter period.

7. Apparatus for forming multiphase periodic control signals having predetermined pulse patterns for controlling a multiphase converter comprising, in combination:
a circuit in accordance with claim 1 for forming a control signal for one phase of the converter; and
delay means, coupled to the control signal for one phase, for producing an additional output signal for each additional phase of the converter, the delay means comprising means for delaying the control signal by a number of clock pulses from the clock corresponding to the desired delay between phases.

8. Apparatus for forming multiphase periodic control signals, each having a predetermined pulse pattern, for controlling a multiphase converter, comprising, in combination:
a first circuit in accordance with claim 7 for forming a control signal for one phase;
an additional circuit in accordance with claim 1 for forming a control signal for each additional phase;
the first counter of each circuit having an input coupled to a common clock pulse generator and the first counter of each additional circuit having a start input; and
a decoder for each additional circuit having an input coupled to the input of the comparator in the first circuit and having an output coupled to the start input of the counter in the corresponding additional circuit, each decoder responsive to a word count corresponding to a predetermined phase shift to delay the formation of the respective pulse pattern.

9. Apparatus for forming multiphase periodic control signals, each having a predetermined pulse pattern, for controlling a multiphase converter comprising, in combination:
a first circuit in accordance with claim 1 for producing the control signal for a first phase;
an additional circuit in accordance with claim 1 for producing the control signal for each additional phase;
the first counter of each circuit having a clock pulse input coupled to a common clock pulse generator and the first counters of each additional circuit having start signal inputs; and
a phase angle control coupled to the start signal input of the first counter of each additional circuit, each phase angle control being coupled to the output of the first counter in the first circuit to delay formation of the respective pulse pattern.

10. Apparatus for forming plural periodic signals having predetermined pulse patterns for controlling plural main valves in a multiphase converter comprising, in combination:
a circuit in accordance with claim 1 for forming a control signal comprising an aggregate pattern of switching pulse edges from code words stored in the memory;
a valve selector circuit comprising a second memory having an input coupled to the address unit and having plural outputs;
plural logic members, each having a first input coupled to an output of the second memory, a second input receiving the control signal from the pulse generator, and an output; and
means coupled to the outputs of the logic members for forming a pulse-width-modulated control signal for each main valve in the converter.

* * * * *